US012245142B2

(12) United States Patent
Vangala et al.

(10) Patent No.: US 12,245,142 B2
(45) Date of Patent: Mar. 4, 2025

(54) INTEGRATED ACCESS AND BACKHAUL SIGNALING AND SELECTION

(71) Applicant: Apple Inc., Cupertino, CA (US)

(72) Inventors: Sarma V. Vangala, Campbell, CA (US); Fangli Xu, Beijing (CN); Dawei Zhang, Saratoga, CA (US); Haijing Hu, Los Gatos, CA (US); Longda Xing, San Jose, CA (US); Murtaza A. Shikari, Mountain View, CA (US); Srinivasan Nimmala, San Jose, CA (US); Tarik Tabet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 17/598,144

(22) PCT Filed: Jun. 14, 2021

(86) PCT No.: PCT/US2021/037279
§ 371 (c)(1),
(2) Date: Sep. 24, 2021

(87) PCT Pub. No.: WO2022/020032
PCT Pub. Date: Jan. 27, 2022

(65) Prior Publication Data
US 2022/0322225 A1 Oct. 6, 2022

(30) Foreign Application Priority Data
Jul. 22, 2020 (WO) ................ PCT/CN2020/103561

(51) Int. Cl.
*H04W 48/20* (2009.01)
*H04W 76/10* (2018.01)
(Continued)

(52) U.S. Cl.
CPC ........... *H04W 48/20* (2013.01); *H04W 76/10* (2018.02); *H04W 84/042* (2013.01); *H04W 88/08* (2013.01)

(58) Field of Classification Search
CPC ... H04W 48/20; H04W 76/10; H04W 84/042; H04W 88/08; H04W 48/16; H04W 36/00835; H04W 24/08; H04W 88/04
See application file for complete search history.

(56) References Cited

U.S. PATENT DOCUMENTS 11,470,547 B2* 10/2022 Luo .................. H04W 24/10
11,617,114 B2* 3/2023 Shih .................. H04W 48/16
370/331
(Continued)

FOREIGN PATENT DOCUMENTS

CN 108513323 9/2018
CN 109076450 12/2018
(Continued)

OTHER PUBLICATIONS

International Patent Application No. PCT/US2021/037279, "International Preliminary Report on Patentability", Feb. 2, 2023, 15 pages.
(Continued)

*Primary Examiner* — Brian T O Connor
(74) *Attorney, Agent, or Firm* — Kilpatrick Townsend & Stockton LLP

(57) ABSTRACT

The present application relates to devices and components including apparatus, systems, and methods for integrated access and backhaul donor indications in wireless networks. In some embodiments, a radio access network node may generate system information to transmit these indications to user equipments in wireless cells.

20 Claims, 8 Drawing Sheets

(51) Int. Cl.
  *H04W 84/04* (2009.01)
  *H04W 88/04* (2009.01)
  *H04W 88/08* (2009.01)

(56) References Cited

U.S. PATENT DOCUMENTS

| | | | | |
|---|---|---|---|---|
| 11,617,117 B2* | 3/2023 | Sheng | ............... | H04W 48/16 |
| | | | | 370/331 |
| 11,627,518 B2* | 4/2023 | Luo | ............... | H04W 48/16 |
| | | | | 455/446 |
| 11,653,178 B2* | 5/2023 | Qiao | ............... | H04W 64/00 |
| | | | | 455/456.3 |
| 11,742,968 B2* | 8/2023 | Zhang | ............... | H04W 24/08 |
| | | | | 370/252 |
| 11,751,100 B2* | 9/2023 | Mao | ............... | H04W 28/088 |
| | | | | 370/329 |
| 2021/0259051 A1* | 8/2021 | Latheef | ............... | H04W 24/02 |
| 2022/0312311 A1 | 9/2022 | Vangala et al. | | |
| 2023/0012327 A1* | 1/2023 | Wei | ............... | H04W 40/246 |
| 2023/0422096 A1* | 12/2023 | Mao | ............... | H04W 28/086 |

FOREIGN PATENT DOCUMENTS

| | | |
|---|---|---|
| CN | 110536377 | 12/2019 |
| WO | 2019191955 | 10/2019 |
| WO | 2019192524 | 10/2019 |
| WO | 2019216717 | 11/2019 |
| WO | 2020060224 | 3/2020 |
| WO | 2020108737 | 6/2020 |
| WO | 2021203267 | 10/2021 |
| WO | 2022020032 A1 | 1/2022 |

OTHER PUBLICATIONS

UP Aspects of Supporting NR-DC for IAB-nodes, Ericsson, R3-192436, 3GPP TSG-RAN WG3 Meeting #104, May 13-17, 2019, 5 pages.
International Patent Application No. PCT/US2021/037279, International Search Report and Written Opinion, Mailed on Nov. 29, 2021, 20 pages.
International Patent Application No. PCT/US2021/037279, Invitation to Pay Additional Fees and, Where Applicable, Protest Fee, Mailed on Oct. 8, 2021, 6 pages.
International Patent Application No. PCT/CN2020/083661, International Search Report and Written Opinion, Mailed on Dec. 30, 2020, 8 pages.
3rd Generation Partnership Project; Technical Specification Group Radio Access Network; NR; Study on Integrated Access and Backhaul (Release 16), 3GPP TR 38.874 V16.0.0, Dec. 2018, 111 pages.
3rd Generation Partnership Project; Technical Specification Group Radio Access Network; NR; User Equipment (UE) radio access capabilities (Release 16), 3GPP TS 38.306 V16.0.0, Mar. 2020, 64 pages.
3rd Generation Partnership Project; Technical Specification Group Radio Access Network; NR; Radio Resource Control (RRC) protocol specification (Release 16), 3GPP TS 38.331 V16.0.0, Mar. 2020, 835 pages.
IAB Architecture, Ericsson, R3-190351, 3GPP TSG-RAN WG3 Meeting #103, Mar. 1, 2019, 13 pages.
Remaining aspects of IAB initial access, Nokia, Nokia Shanghai Bell, R2-2001058, 3GPP TSG-RAN WG2 Meeting #109e, Mar. 6, 2020, 7 pages.
Notification Concerning Transmittal of International Preliminary Report on Patentability, dated Feb. 2, 2023 in 15 pages.

* cited by examiner

INTEGRATED ACCESS AND BACKHAUL SIGNALING AND SELECTION

CROSS-REFERENCE TO RELATED APPLICATIONS

This application is a 371 U.S. National Phase of PCT International Patent Application No. PCT/US2021/037279, filed on Jun. 14, 2021, which claims priority to PCT International Patent Application No. PCT/CN2020/103561, filed on Jul. 22, 2020. The disclosures of these applications are incorporated herein by reference in their entireties for all purposes.

FIELD

The present application relates to wireless communication systems including apparatuses, systems, and methods for integrated access and backhaul signaling and reselection.

BACKGROUND

Integrated access and backhaul (IAB) is a network technology in Third Generation Partnership Project (3GPP) to facilitate relaying of access traffic by sharing radio resources between access and backhaul links. In an IAB deployment, an IAB donor is a radio access network (RAN) node that provides a user equipment's (UE's) interface to a core network and provides wireless backhauling functionality to an IAB node. An IAB node is a RAN node that provides a UE with wireless access and wirelessly backhauls the access traffic to another IAB node or an IAB donor. In this manner, last mile connectivity may be improved when having a fiber backhaul to all access nodes is impractical.

BRIEF DESCRIPTION OF DRAWINGS

A better understanding of the present subject matter can be obtained when the following detailed description of various embodiments is considered in conjunction with the following drawings.

Figure 1:
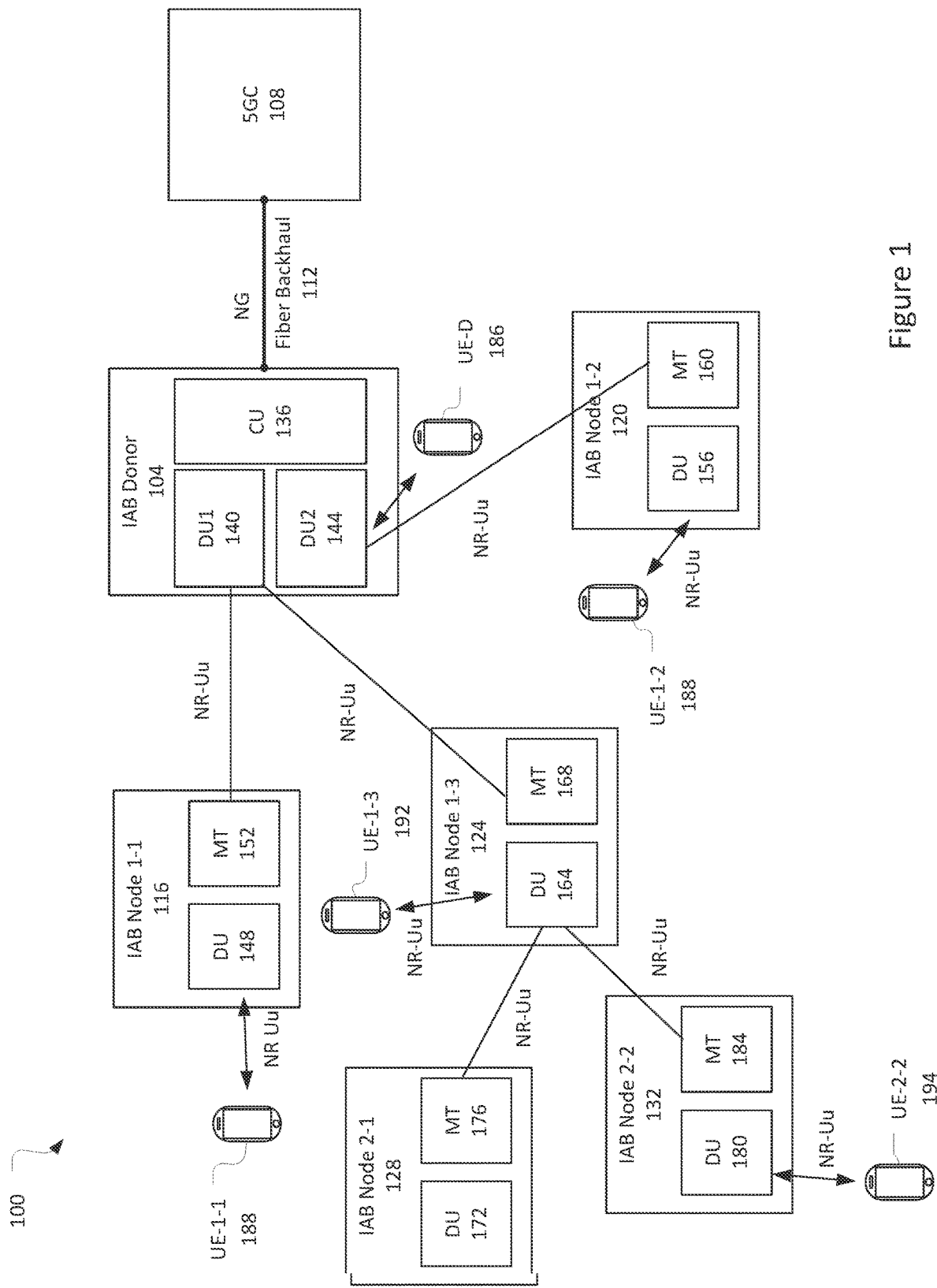
FIG. 1 illustrates network environment in accordance with some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase (A or B) means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC), digital signal processors (DSPs), etc., that are configured to provide the described functionality. In some embodiments, the circuitry may execute one or more software or firmware programs to provide at least some of the described functionality. The term (circuitry) may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term (processor circuitry) may refer an application processor, baseband processor, a central processing unit (CPU), a single-core processor, a dual-core processor, a triple-core processor, a quad-core processor, and/or any other device capable of executing or otherwise operating computer-executable instructions, such as program code, software modules, and/or functional processes.

The term "interface circuitry" as used herein refers to, is part of, or includes circuitry that enables the exchange of information between two or more components or devices. Interface circuitry may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. UE may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, UE may include any type of wireless/wired device or any computing device including a wireless communications interface.

The term "network element" as used herein refers to physical or virtualized equipment and/or infrastructure used to provide wired or wireless communication network services. Network element may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, computer system so and/or "system" may refer to various components of a computer that are communicatively coupled with one another. Computer system may refer to multiple computer devices and/or multiple computing systems that are communicatively coupled with one another and configured to share computing and/or networking resources.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. Channel may be synonymous with and/or equivalent to communications channel, data communications channel, transmission channel, data transmission channel, access channel, data access channel, link, data link, carrier, radio-frequency carrier, and/or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to an occurrence of an object, which may occur, for example, during execution of program code.

The term "connected" may mean that two or more elements, at a common communication protocol layer, have an established signaling relationship with one another over a communication channel, link, interface, or reference point.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a number of RAN nodes that provide network access to various UEs. In particular, the network environment includes an IAB donor 104 that is coupled with a 3GPP Fifth Generation Core Network (5GC) 108 that offers various data and telecommunications services to customers/subscribers.

The IAB donor 104 may be coupled with the 5GC 108 by a fiber backhaul 112. The fiber backhaul 112 may facilitate communication of network traffic at higher speeds associated with 3GPP New Radio (NR) access links. The interface, or reference point, between the IAB donor 104 and the 5GC 108 may be referred to as an NG interface/reference point. The NG interface/reference point may be split into two parts, an NG user plane (NG-U) interface/reference point to carry traffic data between the RAN nodes and a user plane function (UPF) of the 5GC 108, and an S1 control plane (NG-C) interface/reference point to provide a signaling interface between the RAN nodes and access and mobility management functions (AMFs) of the 5GC 108.

The IAB donor 104 may provide a wireless backhaul to one or more IAB nodes including, for example, IAB node 1-1 116, IAB node 1-2 120, IAB node 1-3 124, IAB node 2-1 128, and IAB node 2-2 132. In some instances, the IAB donor 104 may be referred to as a backend node or a parent IAB node and the IAB nodes may be referred to as intermediate nodes. The IAB nodes may be coupled directly with the IAB donor 104 like, for example, IAB node 1-1 116, IAB node 1-2 120, and IAB node 1-3 124; or may be coupled indirectly with the IAB donor 104 over one or more hops through other IAB nodes like, for example, IAB node 2-1 128 and IAB node 2-2 132. IAB node 1-3 124 may provide wireless backhauls for IAB node 2-1 128 and IAB node 2-2 132.

The IAB donor 104 may include a centralized unit (CU) 136 and one or more distributed units (DUs), for example, DU 140 and DU 144. In general, the CU 136 may handle higher-layer protocols, for example, radio resource control (RRC), packet data convergence (PDCP), and service data adaptation protocol (SDAP) layer protocols, while the DUs handle lower-layer protocols, for example, radio link control (RLC), media access control (MAC), and physical (PHY) layer protocols.

The CU 136 may provide control-plane (CP) functionality by, for example, a CU-CP component, and user-plane (UP) functionality by, for example, a CU-UP component.

Each of the IAB nodes may include a DU and a mobile termination (MT). In particular, IAB node 1-1 116 may include DU 148 and MT 152; IAB node 1-2 120 may include DU 156 and MT 160; IAB node 1-3 124 may include DU 164 and MT 168; IAB node 2-1 128 may include DU 172 and MT 176; and IAB node 2-2 132 may include DU 180 and MT 184.

The MTs may be used to connect an IAB node with an upstream (for example, towards the 5GC 108) RAN node (for example, IAB node or IAB donor). In general, the MTs may provide the IAB nodes with access functionality similar to a UE. For example, the MT may utilize protocols that a typical UE may use to connect to a RAN. The MTs may, for example, allow an IAB node to establish signaling radio bearers (SRBs) and/or data radio bearers (DRBs) with a parent node (an IAB donor or another IAB node). An MT may perform cell selection to identify an upstream RAN node to join and then set up and utilize an RLC channel through a backhaul adaptation protocol (BAP) layer that provides functionality for routing data for different UE bearers over different routes through the network. The MT may also perform, for example, cell reselection, radio-link failure, etc.

The DUs may be used to connect an IAB node with a downstream IAB node or a UE over an NR Uu interface or reference point. The DUs may establish an RLC channel, which may be referred to as a modified RLC channel, to the UEs or the MTs of the downstream IAB node.

The network environment 100 also shows UE-D 186 coupled with DU2 144; UE-1-1 188 coupled with DU 148; UE-1-2 190 coupled with DU 156; UE-1-3 192 coupled with DU 164; and UE-2-2 194 coupled with DU 180.

The CU 136 may be connected to DUs of all the RAN nodes, including those on the IAB donor 104 itself and those on the IAB nodes. The DUs may be connected with the CU 136 using a modified F1 interface/reference point, which may be referred to as F1*, that runs over RLC channel on the wireless backhaul between MT on IAB nodes and a DU on the IAB donor 104, for example, DU1 140 or DU2 144.

In various embodiments, the RAN nodes may support wireless access and backhaul under 6 gigahertz (GHz), for example, frequency range (FR) 1 (generally including 450 to 6,000 Megahertz (MHz), or over 6 GHz, for example, FR 2 (generally including 24,250 to 52,600 MHz, which may also be referred to as millimeter wave (mmWave).

In various embodiments, one or more of the access/backhaul links may employ alternate technologies. For example, the wireless backhaul links may be NR links, while one or more of the access links may be Long-Term Evolution (LTE) links, or vice versa. Embodiments utilizing NR as the wireless backhaul technology may facilitate rapid and dense deployments and may allow the UEs to take advantage of mmWave deployments.

The UEs and RAN nodes may connect with the 5GC 108 in a stand-alone architecture (in which 5G cells are used for both control and user plane) or a non-standalone-architecture (in which an LTE cell is used for control plane and a 5G cell is used for user plane).

While the network environment 100 shows a particular IAB architecture with a CU/DU split architecture, additional/alternative architectures may be utilized (including other CU/DU split architectures or non-split architectures) in embodiments of the present disclosure. For example, the network environment 100 may employ one or more of the IAB architectures described in section 6.2 of 3GPP Technical Report (TR) 38.874, v16.0.0 (2018-12) in accordance with some embodiments.

The multi-hopping topology enabled by the network environment 100 may provide opportunities for improving efficient and reliable access to UEs. However, splitting access/backhaul links may result in intra-IE module switching. Furthermore, an IAB node transmitter/receiver may need to be enabled with inter UE duplexing, or use different frequencies for these operations. These challenges may complicate scheduling and result in the access links experiencing high interference from the backhaul links. Various embodiments describe signaling and operations to facilitate IAB identification and selection by UEs to address these and other challenges.

In some embodiments, in order to reduce latency requirements, the UE 120 may be configured with a preference to connect directly with an IAB donor rather than through an IAB node. In various embodiments, this preference may override, in part or in whole, beam/cell quality metrics, network loading, etc. For example, if the UE 1-2 120 has an option to connect with both the IAB donor 104 and the IAB node 1-2 120, the UE 1-2 120 may select the connection with the IAB donor 104 over the connection with the IAB node 1-2 120 even if the cell provided by the IAB node 1-2 120 has better quality metrics, is less loaded, etc. However, in some embodiments, some threshold level of quality metrics or network loading may disqualify the IAB donor 104 as an option for connection as will be discussed in further detail herein.

To facilitate UE's direct connection with an IAB donor, various embodiments describe signaling that allows a UE to identify a RAN node as an IAB donor in situations in which coverage is available. Various procedures are described in which an IAB donor node can be identified as such and utilized for better end-to-end system performance for the UE.

Figure 2:
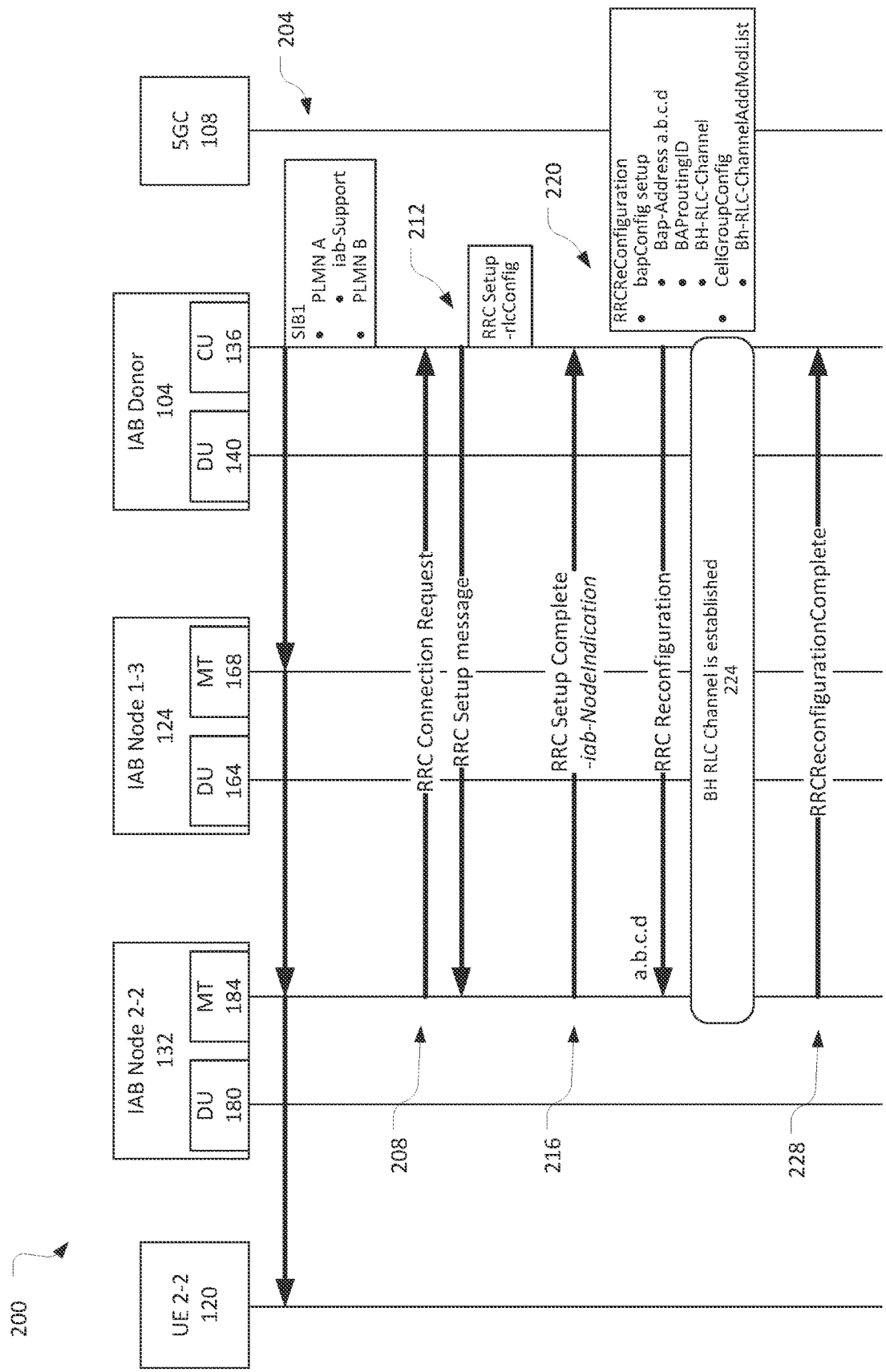
FIG. 2 illustrates a call flow between network nodes in accordance with some embodiments.

FIG. 2 illustrates a call flow 200 between nodes of FIG. 1 to establish a backhaul (BH) RLC channel in accordance with some embodiments.

At 204, the CU 136 may generate a system information broadcast 1 (SIB1) message. The SIB1 message may include remaining minimum system information (RMSI) that provides network nodes with information that will enable them to determine whether they are permitted to access the cell. The SIB1 may be transmitted using a broadcast control channel (BCCH) logical channel, a downlink shared channel (DL-SCH) transport channel, and a physical downlink shared channel (PDSCH) physical channel. For purposes relevant to embodiments described herein, the SIB1 may include an announcement by the IAB donor 104 that it can support IAB as a feature.

The SIB1 may include, in a public land mobile network (PLMN) identity information list (PLMN-IdentityInfoList) information element (IE), a list of PLMN identities and related information. As shown, the SIB1 may include information about PLMN A and PLMN B. The identity information associated with PLMN A may include an iab-Support parameter. This parameter may indicate both support of IAB-node and cell status for the IAB node. In some embodiments, the parameter may be an optional parameter that may have an ENUMERATED 'True' value. Therefore, in these embodiments, the CU 136 may set this parameter to 'True' if the associated cell supports IAB nodes and the cell is also considered as a candidate for IAB nodes; and may not include this parameter at all to indicate the cell does not support IAB nodes and/or the cell is barred for IAB nodes.

An IAB node receiving the iab-Support parameter and seeking to connect to the IAB donor 104, for example, IAB node 2-2 132, may initiate an RRC connection by sending an RRC connection request, which may also be referred to as an RRC setup request, at 208. The RRC connection request may be transmitted on signal radio bearer 0 (SRB0) on a common control channel (CCCH). The RRC connection request may include an identity of the MT 184 and an establishment clause.

The RRC messages, including the connection request, are shown as being directly transmitted between IAB node 2-2 132 and the IAB donor 104. While the RRC messages will traverse the intermediate node, for example, IAB Node 1-3 124, the intermediate node only forwards the messages to the IAB node 2-2 132 and the IAB donor 104 (by amending appropriate routing headers such as, for example, BAP header and RLC header). The intermediate node does not access the content of the messages at the RRC layer.

At 212, the IAB donor 104 may respond with an RRC setup message that includes RLC configuration information. The RLC configuration information may specify a set of acknowledge mode (AM) RLC parameters for SRB1, for example, uplink and downlink sequence number lengths, maximum number of retransmissions, re-assembly timer and status report polling configuration.

The RLC configuration information may be part of a master cell group configuration section of the RRC setup message that further includes information related to MAC and PHY layers, in some embodiments. The RRC setup message may also include a radio bearer configuration including, for example, information related to the PDCP layer. In some embodiments, the CU 136 may generate the radio bearer configuration while the DU 140 generates the master cell group configuration.

Upon receiving the RRC setup message, the IAB node 2-2 132 may transition into an RRC connected state and, upon receiving an uplink resource allocation, may transmit the RRC setup complete message at 216. The RRC setup complete message may include an IAB node indication (iab-NodeIndication) to indicate that the connection is being established by an IAB node.

At 220, the CU 136 may generate and transmit an RRC reconfiguration message to the IAB node 2-2 132. The RRC reconfiguration message may include BAP configuration information (bap-Config) to configure a BAP entity at the MT 184. The bap-Config may include a bap-Address, a bap-Routing ID, or a BH logical channel identity. The bap-Address may indicate a BAP address of the IAB node 2-2 132. The bap-Routing ID and the BH logical channel ID may respectively configure a default uplink routing TD and uplink bh-RLC-Channel during IAB node bootstrapping for F1-AP and non-F1 traffic.

The RRC reconfiguration message may also include a cell group configuration (CellGroupConfig) IE that includes a BH RLC channel to add or modify list (Bh-RLC-ChannelAddModList). The Bh-RLC-ChannelAddModList may provide configuration of a MAC logical channel and corresponding backhaul RLC entities to be added or modified.

At 224, the BH RLC channel may be established and, at 228, the MT 184 may transmit an RRC reconfiguration complete message to the CE 136. At that point, the IAB node 2-2 132 may transmit information from/to the UE 2-2 over the BH RLC channel to the IAB donor 104.

As briefly discussed above, in some embodiments, a UE may prefer a direct connection to an IAB donor, rather than connecting through an IAB node in order to reduce latency. In order to prioritize the IAB-donor connection, a UE may need to be able to identify a RAN node as an IAB donor in situations in which coverage is available. Therefore, in various embodiments, the iab-Support parameter may be utilized by a UE to identify a RAN node as an IAB donor.

Figure 3:
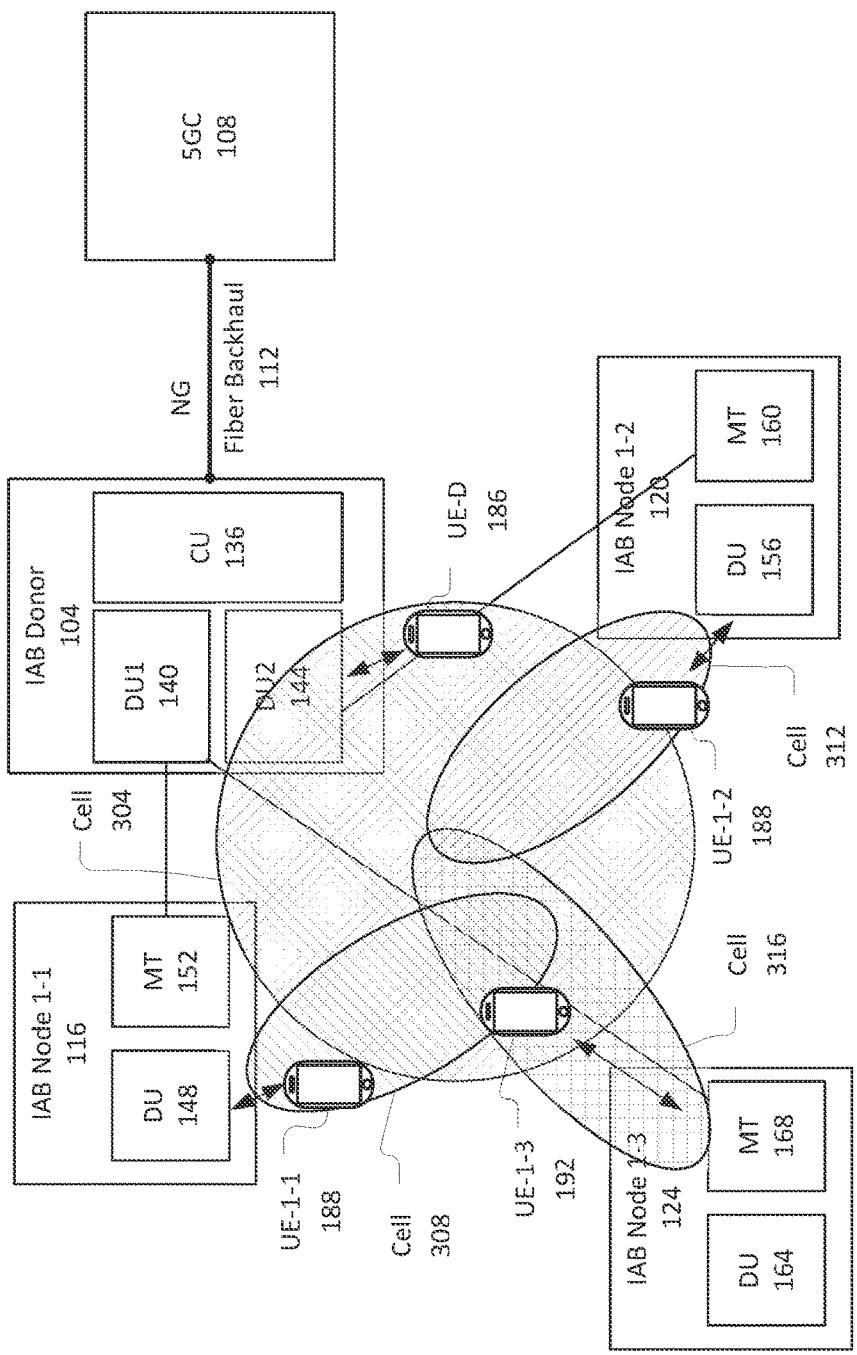
FIG. 3 illustrates nodes of a network environment in accordance with some embodiments.

FIG. 3 illustrates nodes of the network environment 100 in accordance with another embodiment. The network environment 100 is shown with cell 304 provided by the IAB donor 104, cell 308 provided by IAB node 1-1 116; cell 312 provided by IAB node 1-2 120; and cell 316 provided by IAB node 1-3 124.

UE-D 186 may only be in cell 304. Similarly, UE-1-1 188 may only be in cell 308. Therefore, these UEs do not have a choice for cell selection and may connect with IAB donor 104 and IAB node 1-1 116, respectively. However, UE-1-2 188 and UE-1-3 192 may be in locations of at least partially overlapping coverage. Thus, these UEs may have a choice of RAN nodes with which they may connect.

In some embodiments, to facilitate a UE's IAB-donor connection preference, a UE may check for the iab-Support parameter in the SIB1 message. In this manner, the UE may determine that a RAN node sending the IE is an IAB donor with a high-speed backhaul connection without multi-hopping. For example, the UE-1-2 188 may check for the iab-Support parameter transmitted in SIB1s transmitted by the IAB node 1-2 120 and the IAB donor 104. The parameter may be present in the SIB1 transmitted by the IAB donor 104 but may be absent in the SIB1 transmitted by the IAB node 1-2 120. Thus, the UE-1-2 188 may prioritize a connection with the IAB donor 104. The UE-1-3 192 may operate in a similar way.

Thus, in some embodiments the iab-Support parameter may indicate both support of IAB-node and UE and cell status for the IAB node/JE. Therefore, in these embodiments, a CU of an IAB donor may set this parameter to 'True' if the associated cell supports both IAB nodes/UEs and the cell is also considered as a candidate for IAB nodes/UEs; and may not include this parameter at all to indicate the cell does not support IAB nodes/UEs and/or the cell is barred for IAB nodes/UEs.

Upon identifying a RAN node as an IAB donor, a UE may store cell fingerprinting information in an access prioritization structure. The cell fingerprinting information may include, for example, cell identity information and location information (for example, latitude and longitude) of IAB donors. A UE may rely on this cell fingerprinting information to later identify IAB donors whenever the UE finds itself in an associated coverage area. In some embodiments, if the UE camps on a donor cell, the UE may be able to use fingerprinting information as an offline cell ID storage and prioritization mechanism for access. In this manner, the UE may store the data offline in, for example, local storage, a separate database, or cloud storage, and may retrieve the data as appropriate to augment the system information received from the network.

One challenge of allowing a UE to self-select an IAB donor for connection may be an increase radio load on the IAB donors. The core/backend load will remain the same regardless of whether all UEs are connected directly with an IAB donor, or some are connected to the IAB donor through one or more IAB nodes. However, if all the UEs connect directly with the IAB donor, the radio load of the IAB donor may become over-burdened. This may lead to scheduling complications or delay at the cell level that could introduce latency to the communications.

In some embodiments, the IAB donors may have mechanisms to control levels of UE direct connections. For example, the IAB donor may generate system information to include a direct-connection indication to indicate whether the IAB donor is available to a UE for cell selection. In general, references herein to (cell selection) also include cell reselection unless otherwise noted. In some embodiments, the IAB donor may use a cell barred (CellBarred) parameter in a master information block (MIB) for the direct-connection indication. In other embodiments, the IAB donor may use a cell reserved for other use (CellReservedForOtherUse) parameter in a SIB1 for the direct-connection indication.

The UE may rely on the direct-connection indication in the system information to identify situations in which the radio resources of the IAB donor are over-loaded.

In some embodiments, the direct-connection indication may be an IE within the iab-Support IE. For example, the iab-Support IE may include an isNotSupportedNowForNon-IAB Boolean flag, which may be true or false. This Boolean flag may only be applicable to UEs. IAB nodes may ignore this field. In some embodiments, the IAB nodes may ignore this field in cases of low-radio resource availability. For example, when the IAB node only has a limited option for a radio connection. In some embodiments, the IAB node may use this field in cases of high-radio resource availability (for example, the IAB node has multiple radio connection options and can connect with the IAB donor through another IAB node). In cases of high-radio resources, the IAB node may choose to connect through the other IAB node, rather than using the radio resources of the IAB donor if the flag is set to indicate that the IAB donor is not supporting non-IAB nodes (even though the flag may not technically prohibit the IAB nodes connection).

An IAB donor may control the isNotSupportedNowForNon-IAB Boolean flag based on a current radio load of the IAB donor. For example, if the radio load is over a first predetermined threshold, the isNotSupportedNowForNon-IAB Boolean flag may be set to true to indicate that a direct connection is not support for non-IAB nodes. If the radio load falls below a second predetermined threshold, the IAB donor may set the isNotSupportedNowForNon-IAB Boolean flag to false to indicate that a direct connection is supported for non-IAB nodes. The second predetermined threshold may be the same as the first predetermined threshold or may be different from the first predetermined threshold by an offset to avoid toggling.

In some embodiments, both the IAB donor and the IAB nodes may provide advertisements that can be utilized by the UE in order to make enhanced system selection decisions. In these embodiments, the IAB nodes may indicate to a UE whether it is better for the UE to connect directly with an IAB donor or connect with an IAB node. This indication may be based on a current network situation.

Currently, an IAB node may send the iab-Nodeindication to the IAB donor to indicate that the connection is being established by an IAB node. Delivery of this message to the UE is optional. In some embodiments, this message, or a similar one, may always be transferred to the UE by an IAB node in its SIB1 message to indicate that the RAN node is not an IAB donor.

In some embodiments, the indication of whether a RAN node is an IAB donor or an IAB node may be in an IE within the PLMNIdentity List. The indication may be a Boolean flag, for each PLMN, that indicates whether the RAN node is an IAB donor. For example, an iab-Support IE may be as follows:

iab-Support
  PLMN 1—isDonorIABNode True/False (Boolean)
  PLMN2—isDonorIABNode True/False (Boolean)

In some embodiments, either the presence of this indication or the way that it is received/processed may be based on latency requirements of the UE or current network conditions, for example, time of day, special events, etc.

In some embodiments, the UE may use the indication as part of a cell selection criteria that prioritizes selection of one cell over another. The cell selection criteria may be further based on traffic characteristics with which the UE is configured through, for example, network slicing, access point name (APN) information, etc., or may be determined in another manner.

Consider, for example, an occurrence of an event (for example, a sporting event) that leads to high demand for radio resources. UEs within a location of the high demand may utilize a cell selection criteria that prioritizes connection with an IAB node over connection with an IAB donor node to avoid overburdening the IAB donor. This may be done through, for example, an IAB donor setting an SI advertisement, as discussed above, to indicate that it is not available for a direction connection with UEs. This may additionally/alternatively be accomplished through a UE receiving an indication of a high radio demand situation (through, for example, an SI advertisement from an IAB donor or an IAB node) and proactively prioritizing selection with IAB nodes that are advertised as non-IAB donors through, for example, isDonorIABNode Boolean flag being set to false.

In some embodiments, information related to the IAB donor connection may be specifically configured to a UE through, for example, RRC signaling. This information may include identification information that identifies a RAN node as an IAB node or an IAB donor, selection preference information, radio network congestion information, etc.

Figure 4:
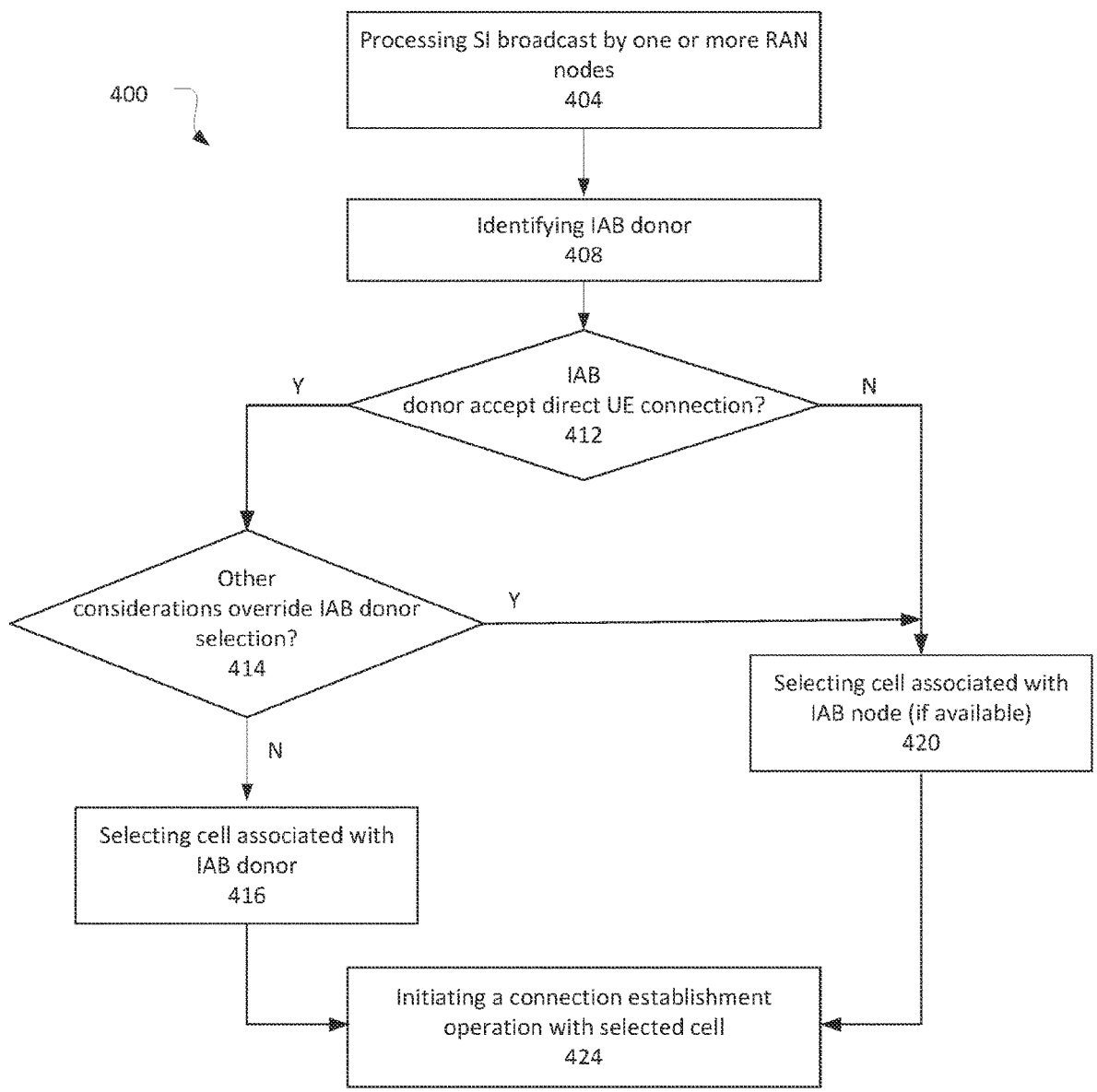
FIG. 4 illustrates an operation flow/algorithmic structure in accordance with some embodiments.
Figure 5:
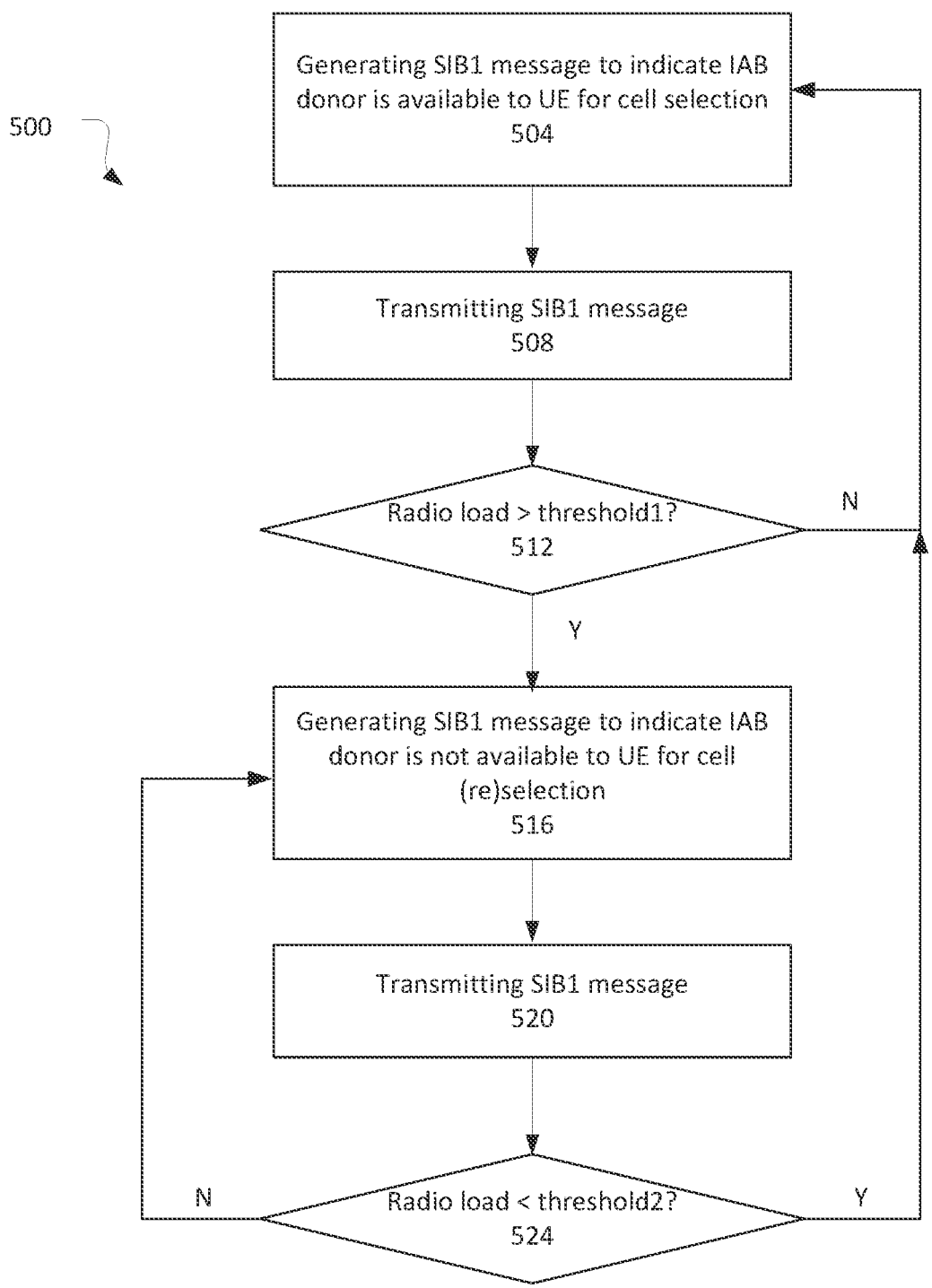
FIG. 5 illustrates an operation flow/algorithmic structure in accordance with some embodiments.
Figure 6:
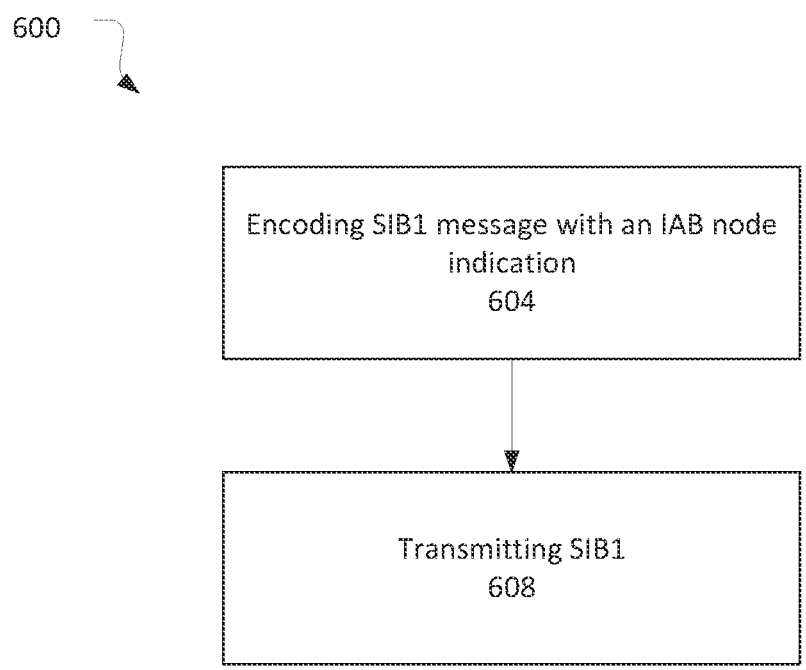
FIG. 6 illustrates an operation flow/algorithmic structure in accordance with some embodiments.

Aspects of the embodiments described herein may be implemented through devices or components performing operation flows/algorithmic structures. FIGS. 4-6 illustrate some operation flows/algorithmic structures in accordance with some embodiments.

FIG. 4 illustrates an operation flow/algorithmic structure 400 in accordance with some embodiments. In various embodiments, the operation flow/algorithmic structure 400 may be implemented by a UE, for example, any of the UEs of FIG. 1 or UE 700, or components thereof, for example, a baseband processor of processors 704.

The operation flow/algorithmic structure 400 may include, at 404, processing system information broadcast by one or more RAN nodes. The SI may be broadcast in an MIB or a SIB and may be transmitted by an IAB node or an IAB donor.

The operation flow/algorithmic structure 400 may further include, at 408, identifying an IAB donor. In some embodiments, the identification of the IAB donor may be a positive identification. For example, a RAN node transmits an indication in, for example, an iab-Support IE, that it is an IAB donor. In other embodiments, the identification of the IAB donor may be an inference. For example, IAB nodes may be required to transmit an indication in SIB1 that they are IAB nodes rather than an IAB donor node. Therefore, if the UE receives a SIB1 that does not include the IAB node indication, the UE may determine that the transmitting RAN node is an IAB donor.

The operation flow/algorithmic structure 400 may further include, at 412, determining whether the IAB donor accepts a direct UE connection. In some embodiments, this determination may be based on explicit signaling, for example, an indication from the IAB donor that it is accepting direct UE connections. In other embodiments, this determination may be an implicit determination, for example, an IAB donor does not signal that it is not accepting a direct UE connection. Thus, in these embodiments, the UE may simply assume that the IAB donor accepts direct UE connections unless there is a signaled indication to the contrary. In other embodiments, the opposite assumption may be made. That is, the UE may assume that the IAB donor does not accept direct UE connections unless there is a signaled indication that it does.

In some embodiments, the identification of a RAN node as an IAB donor at 408 and determination as to whether the IAB donor accepts direct UE connections at 412 may be based on the same indication transmitted by the IAB donor. For example, in some embodiments, the IAB donor may transmit an isNotSupportedNowForNonIAB indication in an iab-Support IE. This indication may indicate that the node is an IAB donor and may further indicate that it is not so accepting direct UE connections.

If it is determined, that the IAB donor is accepting direct UE connections, the operation flow/algorithmic structure 400 may advance to 414, which may include determining whether other considerations override IAB donor selection.

In some embodiments, the other considerations may relate to the suitability of the cell provided by the IAB donor from the UE or an overall network system perspective. For example, in some embodiments, the other considerations may include determining whether the cell provided by the IAB donor meets UE's cell suitability criteria, which may include, for example, cell quality (based on one or more quality metrics) being over a predetermined threshold.

The other considerations may additionally/alternatively include a relativity determination to compare available IAB node cells to the IAB donor cell. For example, relative interference levels or cell quality between the IAB donor cell and the IAB node cell may be considered. If the cell quality of the IAB node cell is significantly greater than the cell quality of the IAB donor node, it may be that the UE can connect with the IAB node cell with a modulation and coding scheme that makes up for any delay incurred by transmitting over an additional one or more hops.

Still further, the other considerations may include a determination of the suitability of the IAB donor cell for the type of traffic to be transmitted by the UE. For example, if the UE is transmitting delay insensitive data, for example, Internet of Things (IoT) or machine-type communication (MTC) data, in some scenarios, the UE may voluntarily choose an IAB node connection to preserve the IAB donor connections for UEs with more delay sensitive data.

In still another embodiment, the other considerations may be related to a UE receiving an indication of a high radio load at the IAB donor. In some embodiments, this indication may not set an absolute bar on the connection (for example, the IAB donor may still be technically accepting direct UE connections). But rather, this indication may provide an indication that direct UE connections reserved for certain categories of connections, for example, high-priority or low-latency connections.

If other considerations do not override the IAB donor selection at 414, the operation flow/algorithmic structure 400 may include selecting the cell associated with the IAB donor.

If other considerations do override the IAB donor selection at 414, or if it is determined at 412 that the IAB donor is not accepting direct UE connections, the operation flow/algorithmic structure 400 may advance to 420, which includes selecting a cell associated with an IAB node. In these embodiments, the UE may need to rely on the extended service provided by the IAB node as the radio resources of the IAB donor may not be available.

In the event more than one IAB node is available, the UE may select the IAB node having the least number of hops and a cell that meets the UE's suitable cell criteria, as described above. In some embodiments, a number of hops an IAB node is from the IAB donor may be advertised in system information, for example, SIB1, broadcast by the IAB node.

In various embodiments, the selecting at 416 or 420 may be part of an initial cell selection or a reselection and may be done from an RRC idle or inactive state.

The operation flow/algorithmic structure 400 may further include, at 424, initiating a connection establishment operation with the selected cell. In some embodiments, the connection establishment operation may include a two-step or four-step random-access channel (RACH) exchange. If the RACH exchange is successful, the UE may proceed with an RRC setup procedure to establish a logical connection and allow the configuration of a signaling radio bearer for signaling transmissions and one or more data radio bearers for data transmissions.

FIG. 5 illustrates an operation flow/algorithmic structure 500 in accordance with some embodiments. The operation flow/algorithmic structure 500 may be implemented by an IAB donor, for example, IAB donor 104 or RAN node 800, or components thereof, for example, baseband processor of processors 804.

The operation flow/algorithmic structure 500 may include, at 504, generating a SIB1 message to indicate an IAB donor is available to UE for cell selection. In some embodiments, the indication may be an iab-Support IE or one or more UEs or parameters included therein. For example, the indication may be an isNotSupportedNowFor-NonIAB Boolean flag being set to false in an iab-Support IE.

The operation flow/algorithmic structure 500 may further include, at 508, transmitting the SIB1 message. As discussed above, the SIB1 message may be transmitted in using a BCCH logical channel, a DL-SCH transport channel, and a PDSCH physical channel.

The operation flow/algorithmic structure 500 may further include, at 512, determining whether a radio load is greater than a first threshold. The radio load may be measured based on a number of radio connections active at the IAB donor, a total volume of radio traffic, or a combination. The first threshold may be predetermined or configured by a managing network node in, for example, the 5GC.

If it is determined, at 512, that the radio load does not exceed the first threshold, the IAB node may determine that it may continue to accept direct UE connections and the operation flow/algorithmic structure 500 may loop back to 504.

If it is determined, at 512, that the radio load does exceed the first threshold, the IAB node may determine that it needs to restrict radio access. Thus, the operation flow/algorithmic structure may proceed to 516.

The operation flow/algorithmic structure 500 may include, at 516, generating a SIB1 message to indicate that the IAB donor is not available to UE for cell selection. In some embodiments, the indication may be an iab-Support IE or one or more IEs or parameters included therein. For example, the indication may be an isNotSupportedNowFor-NonIAB Boolean flag being set to true in an iab-Support IE.

The operation flow/algorithmic structure 500 may further include, at 520, transmitting the SIB1 message. As discussed above, the SIB1 message may be transmitted in using a BCCH logical channel, a DL-SCH transport channel, and a PDSCH physical channel.

The operation flow/algorithmic structure 500 may further include, at 524, determining whether a radio load is less than a second threshold. The second threshold may be predetermined or configured by a managing network node in, for example, the 5GC. In some embodiments, the second threshold may be the same as the first threshold. However, in other embodiments, there may be a difference or an offset between the two. Providing an offset may reduce toggling between allowing and not allowing the UEs with direct access to the IAB node when the radio load is hovering around the threshold.

If it is determined, at 524, that the radio load is less than the second threshold, the IAB node may determine that it may now accept direct UE connections and the operation flow/algorithmic structure 500 may loop back to 504.

If it is determined, at 524, that the radio load is not less than the second threshold, the IAB node may continue to restrict radio access and the operation flow/algorithmic structure may loop back to 516.

FIG. 6 illustrates an operation flow/algorithmic structure 600 in accordance with some embodiments. The operation flow/algorithmic structure 600 may be implemented by an IAB node, for example, any of the IAB nodes of FIG. 1 or RAN node 800, or components thereof, for example, baseband processor of processors 804.

The operation flow/algorithmic structure 600 may include, at 604, encoding a SIB1 message with an IAB node indication. In some embodiments, the IAB node indication may be an iabSupport IE or one or more IEs or parameters included therein. For example, the indication may be an isDonorIABNode Boolean flag being set to false in an iabSupport IE.

The operation flow/algorithmic structure 600 may further include, at 608, transmitting the SIB1 message. As discussed above, the SIB1 message may be transmitted in using a BCCH logical channel, a DL-SCH transport channel, and a PDSCH physical channel.

Figure 7:
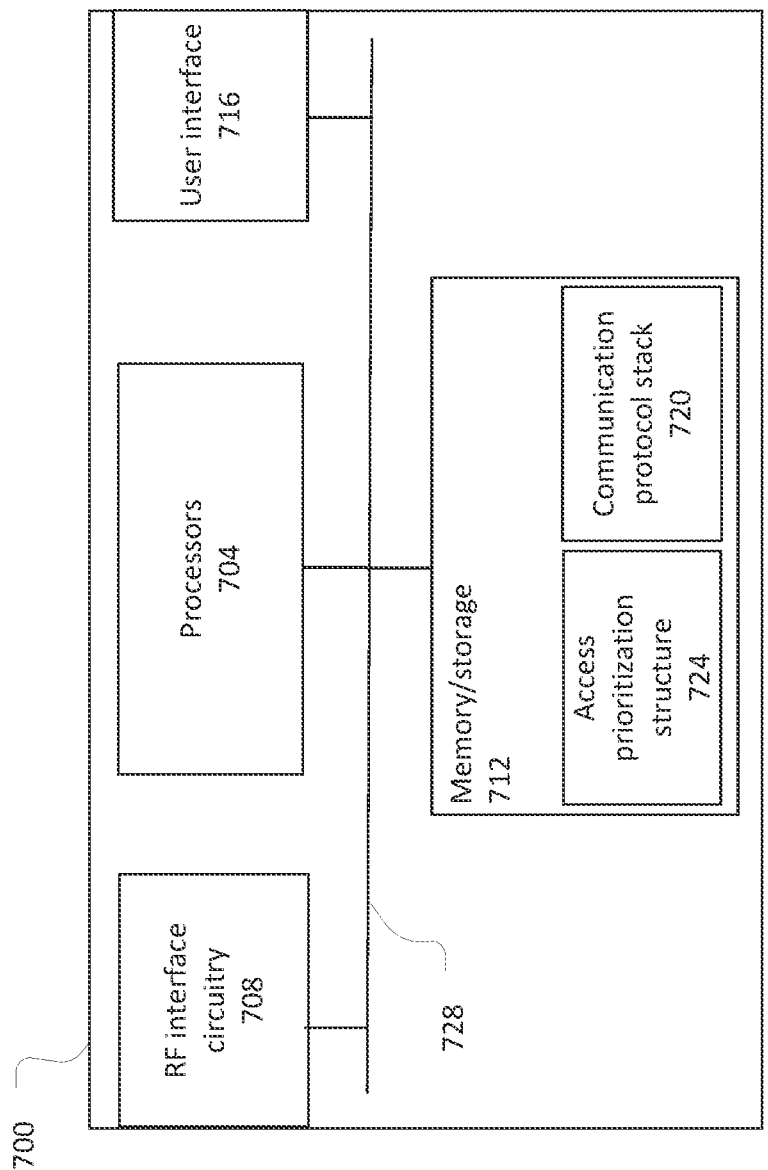
FIG. 7 illustrates a user equipment in accordance with some embodiments.

FIG. 7 illustrates a UE 700 in accordance with some embodiments. The UE 700 may be similar to and substantially interchangeable with any of the UEs of FIG. 1.

The UE 700 may be a consumer electronics device, cellular phone, smartphone, tablet computer, wearable computer device, desktop computer, laptop computer, in-vehicle devices (for example, infotainment device, an instrument cluster, a head-up display device, an onboard diagnostic device, dashtop mobile equipment, mobile data terminal, electronic engine management system, electronic/engine control unit, electronic/engine control module, etc.), embedded system, microcontroller, control module, networked or (smart) appliance, MTC device, IoT device, and/or the like.

The UE 700 may include processors 704, RF interface circuitry 708, memory/storage 712, and user interface 716. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 728, which may represent any type of interface, input/output, bus (local, system, or expansion), transmission line, trace, optical connection, etc. that allows various circuit components (on common or different chips or chipsets) to interact with one another.

The processors 702 may include processing circuitry such as, for example, an application processor, a digital signal processor, a graphics processing unit, a central processing unit, and/or baseband processors. The processors 704 may execute or otherwise operate computer-executable instructions, such as program code, software modules, and/or functional processes from memory/storage 712 to cause the UE 700 to perform operations as described herein.

In some embodiments, a baseband processor of the processors 704 may access the communication protocol stack 720 in the memory/storage 712 to communicate over a 3GPP compatible network. In general, the baseband processors may access the communication protocol stack to: perform user plane functions at a PHY layer, MAC layer, RLC layer. PDCP layer, SDAP layer, and PDU layer; and perform control plane functions at a PHY layer, MAC layer, RLC layer, so PDCP layer, RRC layer, and a non-access stratum (NAS) layer. In some embodiments, the PHY layer operations may additionally/alternatively be performed by the components of the RF interface circuitry.

The baseband processor may generate or process baseband signals or waveforms that carry information in 3GPP-compatible networks. In some embodiments, the waveforms for LTE may be orthogonal frequency division multiplexing (OFDM) in the downlink and single carrier-frequency division multiple access (SC-FDMA) in the uplink. In NR, the waveforms may be based cyclic prefix OFDM (CP-OFDM) in the uplink or downlink, and discrete Fourier transform spread OFDM (DFT-S-OFDM) in the uplink.

The baseband processor may also access information in an access prioritization structure 724 in the memory/storage 712 to select or reselect a cell with which to connect. As described herein, the access prioritization structure 724 may include fingerprinting information, for example, cell identity and location information, corresponding to IAB donors. The access prioritization structure 724 may additionally/alternatively include information on IAB nodes and configured access priority information.

The memory/storage 712 may include any type of volatile or non-volatile memory that may be distributed throughout the UE 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, and/or any other type of memory device technology.

The RF interface circuitry 708 may include transceiver circuitry and radio frequency front module (RFEM) that allows the UE 700 to communicate with other devices over a radio access network. The RF interface circuitry 708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antennas.

In various embodiments, the RF interface circuitry 708 may be configured to transmit/receive signals in a manner compatible with LTE or NR access technologies.

The user circuitry 716 includes various input/output (I/O) devices designed to enable user interaction with the UE 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc), with the output of characters, graphics, multimedia objects, and the like being generated or produced from the operation of the UE 700.

Figure 8:
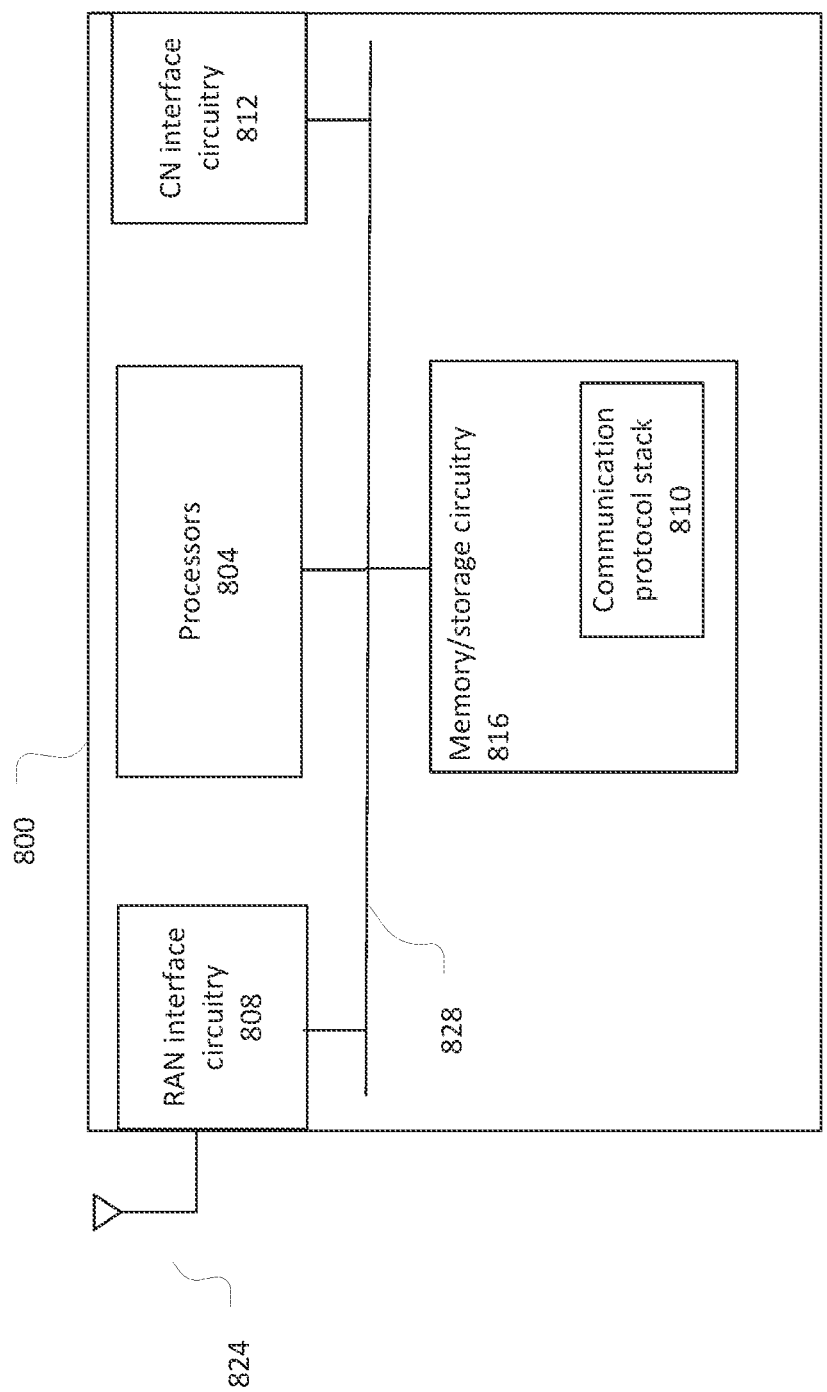
FIG. 8 illustrates a radio access network node in accordance with some embodiments.

FIG. 8 illustrates a RAN node 800 in accordance with some embodiments. The RAN node 800 may be an IAB node or IAB donor as discussed herein. In various embodiments, the RAN node 800 may be a UE (if an IAB node), an eNB (for example, access node of a 3GPP Long Term Evolution (LTE) network), an ng-eNB (for example, an access node that uses an LTE air interface and connects to a 5GC), or a gNB (for example, an access node that uses an NR air interface and connects to a 5GC).

The RAN node 800 may include processors 804, RAN interface circuitry 808, core network (CN) interface circuitry 812, and memory/storage circuitry 816. In embodiments in which the RAN node 800 is an IAB node and does not have a connection with the CN over a wired backhaul, the RAN node 800 may not include the CN interface circuitry 812.

The components of the RAN node 800 may be coupled with various other components over one or more interconnects 828.

The processors 804, RAN interface circuitry 808, memory/storage circuitry 816 (including communication protocol stack 810), and interconnects 828 may be similar to like-named elements shown and described with respect to FIG. 7.

The CN interface circuitry 812 may provide connectivity to a core network, for example, 5GC 108 using a 5GC-compatible network interface protocol such as Carrier Ethernet protocols, or some other suitable protocol. Network connectivity may be provided to/from the RAN node 800 via a fiber optic backhaul. The network controller circuitry 1635 may include one or more dedicated processors and/or FPGAs to communicate using one or more of the aforementioned protocols. In some implementations, the CN interface circuitry 812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: processing system information broadcast by one or more RAN nodes; identifying, based on the system information, an IAB donor of the one or more RAN nodes; and initiating a connection establishment operation with the IAB donor.

Example 2 includes the method of example 1 or some other example herein, further comprising: detecting a plurality of RAN nodes that include the IAB donor and one or more IAB nodes; selecting the IAB donor from the plurality of RAN nodes based on a determination that an IAB donor connection has a higher priority than an IAB node connection; and initiating the connection establishment operation with the IAB donor based on selection of the IAB donor.

Example 3 includes the method of example 1 or some other example herein, wherein processing the system information includes decoding one or more SIB1 messages respectively broadcast by the one or more RAN nodes.

Example 4 includes the method of example 3 or some other example herein, wherein identifying the IAB donor comprises: extracting PLMN information from a first SIB1 of the one or more SIB1 messages to obtain an IAB support IE; and identifying the IAB donor based on the IAB support IE.

Example 5 includes the method of example 1 or some other example herein, further comprising: storing, based on said identification of the IAB donor, identification and location information associated with the IAB donor in an access prioritization structure.

Example 6 includes the method of example 1 or some other example herein, wherein the connection establishment operation is a first connection establishment operation and the method further comprises: determining, based on an access prioritization structure, identification and location information associated with or more previously-identified IAB donors; and initiating a second connection establishment operation with at least one of the one or more previously-identified IAB donors.

Example 7 includes the method of example 1 or some other example herein, further comprising: detecting a flag that indicates the IAB donor accepts a direct UE connection; and initiating the connection establishment operation based on said detection of the flag.

Example 8 includes the method of example 1 or some other example herein, further comprising: processing a SIB1 message from a RAN node of the one or more RAN nodes; and determining, based on the SIB1 message, that the RAN node is an IAB node.

Example 9 includes a method of operating an IAB donor, the method comprising: generating a message that includes an indication of whether the IAB donor is available for cell selection by UEs; and transmitting the message by a RAN interface.

Example 10 includes the method of example 9 or some other example herein, wherein the message is a SIB1 message and the indication is a cell reserved for other use indication.

Example 11 includes the method of example 9 or some other example herein, wherein the message is a MIB message and the indication is a cell barred indication.

Example 12 includes the method of example 9 or some other example herein, wherein the message is a SIB1 message and the indication is in an IAB support IE.

Example 13 includes the method of example 12 or some other example herein, so wherein the indication is a true or false Boolean flag.

Example 14 includes the method of example 12 or some other example herein, wherein the message is a first message, the indication is to indicate that the IAB donor is not available for cell selection by UEs, and the method further comprises: determining a radio load at the IAB donor is below a predetermined threshold; and generating, based on the determination that the radio load is below the predetermined threshold, a second message with an indication that the IAB donor is available for cell selection by UEs.

Example 15 includes a method of operating a RAN node, the method comprising: encoding a SIB1 message with an indication that the RAN node is an IAB node; and transmitting the SIB1 message via a physical downlink shared channel.

Example 16 includes the method of example 15 or some other example herein, wherein encoding the SIB1 message includes encoding the indication within an IAB support IE.

Example 17 includes the method of example 16 or some other example herein, wherein the IAB support IE includes a PLMN identity list that includes information related to a plurality of PLMNs and said encoding the SIB1 comprises: encoding a Boolean flag corresponding to individual PLMNs of the plurality of PLMNs to indicate whether the RAN node is an IAB donor with respect to an associated PLMN Example 18 includes the method of example 17 or some other example herein, wherein the indication comprises a false Boolean value to indicate that the IAB device is not an IAB donor.

Example 19 includes the method of example 15 or some other example herein, further comprising: encoding an indication of a high-radio demand situation; and transmitting the indication of the high-radio demand situation to one or more UEs in an access cell.

Example 20 includes the method of example 15 or some other example herein, further comprising: encoding, with a message, a priority indication to indicate whether a UE is to prioritize an IAB donor connection or an IAB node connection; and transmitting the message to the UE.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment. PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as so shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   process system information broadcast by one or more radio access network (RAN) nodes;
   identify, based on the system information, an integrated access and backhaul (IAB) donor of the one or more RAN nodes;

store cell fingerprinting information in an access prioritization structure, the cell fingerprinting information to include location information of the IAB donor; and initiate, based on the cell fingerprinting information, a connection establishment operation with the IAB donor.

2. The one or more non-transitory computer-readable media of claim 1, wherein the instructions, when executed, further cause the processing circuitry to:

detect a plurality of RAN nodes that include the IAB donor and one or more IAB nodes;

select the IAB donor from the plurality of RAN nodes based on a determination that an IAB donor connection has a higher priority than an IAB node connection; and initiate the connection establishment operation with the IAB donor based on selection of the IAB donor.

3. The one or more non-transitory computer-readable media of claim 1, wherein to process the system information, the instructions, when executed, cause the processing circuitry to:

decode one or more system information block 1 (SIB1) messages respectively broadcast by the one or more RAN nodes.

4. The one or more non-transitory computer-readable media of claim 3, wherein to identify the IAB donor the instructions, when executed, cause the processing circuitry to:

extract public land mobile network (PLMN) information from a first SIB1 of the one or more SIB1 messages to obtain an IAB support information element (IE); and identify the IAB donor based on the IAB support IE.

5. The one or more non-transitory computer-readable media of claim 4, wherein said storing the cell fingerprinting information is based on said identification of the IAB donor.

6. The one or more non-transitory computer-readable media of claim 1, wherein the connection establishment operation is a first connection establishment operation, fingerprinting information is a first fingerprinting information, the location information is a first location information, and the instructions, when executed, further cause the processing circuitry to:

determine, based on the access prioritization structure, second fingerprinting information including second location information associated with a previously-identified IAB donor; and initiate a second connection establishment operation with the previously-identified IAB donor.

7. The one or more non-transitory computer-readable media of claim 1, wherein the instructions, when executed, further cause the processing circuitry to:

detect a flag that indicates the IAB donor accepts a direct UE connection; and initiate the connection establishment operation based on said detection of the flag.

8. The one or more non-transitory computer-readable media of claim 1, wherein the instructions, when executed, further cause the processing circuitry to:

process a system information block 1 (SIB1) message from a RAN node of the one or more RAN nodes; and determine, based on the SIB1 message, that the RAN node is an IAB node.

9. A method comprising:

processing system information broadcast by one or more radio access network (RAN) nodes;

identifying, based on the system information, an integrated access and backhaul (IAB) donor of the one or more RAN nodes;

storing cell fingerprinting information in an access prioritization structure, the cell fingerprinting information to include location information of the IAB donor; and initiating, based on the cell fingerprinting information, a connection establishment operation with the IAB donor.

10. The method of claim 9, further comprising:

detecting a plurality of RAN nodes that include the IAB donor and one or more IAB nodes;

selecting the IAB donor from the plurality of RAN nodes based on a determination that an IAB donor connection has a higher priority than an IAB node connection; and initiating the connection establishment operation with the IAB donor based on selection of the IAB donor.

11. The method of claim 9, wherein processing the system information comprises:

decoding one or more system information block 1 (SIB1) messages respectively broadcast by the one or more RAN nodes.

12. The method of claim 11, wherein identifying the IAB donor comprises:

extracting public land mobile network (PLMN) information from a first SIB1 of the one or more SIB1 messages to obtain an IAB support information element (IE); and identifying the IAB donor based on the IAB support IE, wherein said storing the cell fingerprinting information is based on said identification of the IAB donor.

13. The method of claim 9, wherein the connection establishment operation is a first connection establishment operation, fingerprinting information is a first fingerprinting information, the location information is a first location information, and the method further comprises:

determining, based on the access prioritization structure, second fingerprinting information including second location information associated with a previously-identified IAB donor; and initiating a second connection establishment operation with the previously-identified IAB donor.

14. The method of claim 9, further comprising:

detecting a flag that indicates the IAB donor accepts a direct UE connection; and initiating the connection establishment operation based on said detection of the flag.

15. An apparatus comprising:

processing circuitry configured to:

process system information broadcast by one or more radio access network (RAN) nodes;

identify, based on the system information, an integrated access and backhaul (IAB) donor of the one or more RAN nodes;

store cell fingerprinting information in an access prioritization structure, the cell fingerprinting information to include location information of the IAB donor; and initiate, based on the cell fingerprinting information, a connection establishment operation with the IAB donor; and memory interface circuitry coupled with the processing circuitry, to store the system information broadcast in memory.

16. The apparatus of claim 15, wherein the processing circuitry is further configured to:

detect a plurality of RAN nodes that include the IAB donor and one or more IAB nodes;

select the IAB donor from the plurality of RAN nodes based on a determination that an IAB donor connection has a higher priority than an IAB node connection; and initiate the connection establishment operation with the IAB donor based on selection of the IAB donor.

17. The apparatus of claim 15, wherein the processing circuitry is further configured to:
   decode one or more system information block 1 (SIB1) messages respectively broadcast by the one or more RAN nodes.

18. The apparatus of claim 15, wherein to identify the IAB donor the processing circuitry is configured to:
   Extract public land mobile network (PLMN) information from a first SIB1 of the one or more SIB1 messages to obtain an IAB support information element (IE); and
   identify the IAB donor based on the IAB support IE, wherein said storing the cell fingerprinting information is based on said identification of the IAB donor.

19. The apparatus of claim 15, wherein the connection establishment operation is a first connection establishment operation, fingerprinting information is a first fingerprinting information, the location information is a first location information, and the processing circuitry is further configured to:
   determine, based on the access prioritization structure, second fingerprinting information including second location information associated with a previously-identified IAB donor; and
   initiate a second connection establishment operation with the previously-identified IAB donor.

20. The apparatus of claim 15, wherein the processing circuitry is configured to:
   detect a flag that indicates the IAB donor accepts a direct UE connection; and
   initiate the connection establishment operation based on said detection of the flag.

* * * * *